United States Patent Office 3,716,453
Patented Feb. 13, 1973

3,716,453
METHOD OF PRODUCING L-HISTIDINE BY FERMENTATION
Shinji Okumura, Tokyo, Fumihiro Yoshinaga, Kanagawa-ken, and Koji Kubota and Hirotaka Kamijo, Tokyo, Japan, assignors to Ajinomoto Co., Inc., Tokyo, Japan
No Drawing. Filed June 10, 1970, Ser. No. 45,262
Claims priority, application Japan, June 25, 1969,
44/50,161
Int. Cl. C12b *1/00;* C12d
U.S. Cl. 195—29                              9 Claims

ABSTRACT OF THE DISCLOSURE

Microorganisms of the genera Brevibacterium, Corynebacterium, and Arthrobacter are exposed to mutagenic chemical agents or to ionizing radiation, and the exposed organisms are screened for the presence of mutants capable of producing L-histidine by aerobic fermentation of conventional culture media. The best mutant strain so selected produces 4.3 g./l. L-histidine in the broth within 48 hours. The histidine is recovered in good yields by absorption from the broth on ion exchange resin.

---

This invention relates to the production of L-histidine, and particularly to a method of producing L-histidine by fermentation.

L-histidine, hereinafter referred to as histidine, is one of the amino acids important as a nutrient and has been used as a food supplement, in medical research, and as an intermediate in the preparation of urocanic acid and histamine. Histidine was prepared heretofore on a commercial scale by extraction of protein hydrolyzates at relatively high cost in a complex procedure.

It has now been found that certain mutants induced by conventional mutagenic agents from microorganisms of the genera Brevibacterium, Corynebacterium, and Arthrobacter are capable of producing extracellular histidine during aerobic fermentation of conventional nutrient media, that the mutants are readily selected by routine methods on the basis of their ability of producing histidine, and that the histidine formed by fermentation can be recovered from the fermentation broth by methods not novel in themselves. Some mutants are found to be resistant to more than 1000 $\gamma$/ml. of 2-thiazole alanine in medium.

The most effective histidine-producing mutants found so far are *Brevibacterium flavum* AJ 3225 (ATCC 21406), *Corynebacterium acetoacidophilum* AJ 3227 (ATCC 21407), and *Arthrobacter citreus* AJ 3229 (ATCC 21412). Specimen cultures of these microorganisms are freely available to qualified persons without our permission from the American Type Culture Collection in Washington, D.C. They were obtained, respectively, from *Brevibacterium flavum* ATCC 14067, *Corynebacterium acidophilum* ATCC 13870, and *Arthrobacter citreus* ATCC 17775 by exposing vegetative cells or spores of the parent strains to ultra-violet light, X-rays, or gamma rays in mutagenic doses, or to sodium nitrite, nitrosoguanidine, or diethyl sulfate solution, which are known chemical mutagenic agents. The parent strains cannot produce extracellular L-histidine. They are also freely available without our permission from ATCC.

The nutrient media fermented by means of the microorganisms of the invention are conventional in themselves and contain assimilable sources of carbon and nitrogen, as well as minor amounts of growth promoting organic substances and inorganic salts. Assimilable carbon sources include carbohydrates (glucose, sucrose, starch hydrolyzate, molasses, and starch), organic acids (acetic acid, fumaric acid, citric acid, lactic acid, gluconic acid and fatty acids), alcohols (methanol, ethanol, propanol, butanol, glycerine, sorbitol and mannitol), and hydrocarbons (n-paraffin, olefin and gaseous hydrocarbons).

For a good yield of histidine, the fermentation is carried out aerobically with aeration and agitation. Best yields require pH control within the range of 5 to 9. The desired pH may be maintained by means of gaseous or aqueous ammonia, calcium carbonate, alkali metal hydroxide, urea, organic or inorganic acids which may be added to the medium from time to time and may also supply assimilable nitrogen, as is well known. When the fermentation is carried out at 25° to 37° C., the maximum concentration of histidine in the broth is reached within 2 to 7 days.

The histidine recovered from the broth by conventional ion exchange techniques was identified by the $R_f$ value of a paper chromatogram, by the color developed on the chromatogram by diazo reaction, and by the response of histidine-requiring microorganisms in a minimal nutrient medium. The histidine present in the broth was determined by bio-assay employing the histidine requiring Leuconostoc citrovorum.

The following examples further illustrate the invention as practiced by means of the best histidine producing mutant strains available to us at this time.

EXAMPLE 1

An aqueous culture medium was prepared to contain, per liter, 100 g. sucrose, 2 g. $KH_2PO_4$, 15 g. ammonium sulfate, 0.4 g. $MgSO_4 \cdot 7H_2O$, 200$\gamma$ biotin, 50$\gamma$ thiamine hydrochloride, 2 mg. $Fe^{++}$, 2 mg. $Mn^{++}$, and 1% soybean protein hydrolyzate. Its pH was adjusted to 7.5. 300 ml. batches of the solution were sterilized by steam in 1000 ml. fermentation vessels and inoculated with *Brevibacterium flavum* AJ 3225 which has previously been cultured on bouillon slants at 30° C. for 24 hours. A pH of 7.5 was maintained at 32° C. for 48 hours by additions of gaseous ammonia, whereby 4.3 g./l. L-histidine were produced in the broth.

The microbial cells were removed from 5 liters of the broth by centrifuging, and the liquid was passed over a strongly acidic ion exchange resin which retained the histidine. The resin was eluted with ammonium hydroxide solution, and the eluate was partly evaporated in a vacuum. Upon cooling, histidine crystallized from the concentrate, and 8.4 g. crystalline L-histidine were ultimately obtained.

EXAMPLE 2

An aqueous culture medium was prepared to contain, per liter, 100 g. glucose, 1 g. $KH_2PO_4$, 0.4 g. $MgSO_4 \cdot 7H_2O$, 40 g. ammonium sulfate, 100$\gamma$ biotin, 200$\gamma$ thiamine hydrochloride, 2 mg. $Fe^{++}$, 2 mg. $Mn^{++}$, and 1 g. yeast extract. Its pH was adjusted to 7.0. 20 ml. batches of the medium were sterilized with steam and mixed each with 5 g. separately sterilized calcium carbonate. Each batch was inoculated in a fermentation vessel with *Corynebacterium acetoacidophilum* AJ 3227 which had previously been cultured on bouillon-agar slants at 30° C. for 24 hours, and the fermentation was carried out at 30° C. for 48 hours. Histidine accumulated in the broth to a concentration of 1.2 g./l.

EXAMPLE 3

An aqueous culture medium was prepared to contain, per liter, 70 g. glucose, 1 g. $KH_2PO_4$, 0.4 g. $MgSO_4 \cdot 7H_2O$, 30 g. ammonium sulfate, 50$\gamma$ biotin, 200$\gamma$ thiamine hydrochloride, and 20 ml. soybean protein hydrolyzate. The pH was adjusted to 7.2. 20 ml. batches were sterilized, mixed with 5 g. separately sterilized calcium carbonate, and inoculated with *Arthrobacter citreus* AJ 3229 previously cultured as described in Example 1. After 55 hours of fermentation at 31.0° C., the broth contained 1.2 g./l. L-histidine.

While the invention has been described with particular reference to specific embodiments, it is to be understood that it is not limited thereto, but is to be construed broadly and restricted solely by the scope of the appended claims.

We claim:

1. A method of producing L-histidine which comprises culturing a microorganism of one of the genera Brevibacterium, Corynebacterium, and Arthrobacter under aerobic conditions in a nutrient medium containing assimilable sources of carbon and nitrogen and minor amounts of organic nutrients and inorganic salts necessary for the growth of said microorganism; and maintaining the pH value of said medium within the range from 5 to 9 until extracellular histidine is produced in said medium, said microorganism being an artificially induced mutant of a parent strain incapable of producing said extracellular histidine when cultured on said nutrient medium.

2. A method as set forth in claim 1, wherein said microorganism is *Brevibacterium flavum* ATCC 21406.

3. A method as set forth in claim 1, wherein said microorganism is *Corynebacterium acetoacidophilum* ATCC 21407.

4. A method as set forth in claim 1, wherein said microorganism is *Arthrobacter citreus* ATCC 21412.

5. A method as set forth in claim 1, which further comprises recovering said L-histidine from said medium.

6. A method as set forth in claim 1, wherein said microorganism is cultured on said medium until the concentration of said L-histidine in said medium is at least one gram per liter.

7. A method as set forth in claim 1, wherein said parent strain is a strain of *Brevibacterium flavum, Corynebacterium acetoacidophilum*, or *Arthrobacter citreus*.

8. A method as set forth in claim 1, wherein said microorganism is cultured on said medium at a temperature of 25° to 37° C. until the concentration of said L-histidine in said medium is at least one gram per liter; and said L-histidine is recovered from said medium.

9. A method as set forth in claim 1, wherein said mutant is a strain resistant to more than $1000\gamma$ per milliliter of 2-thiazole alanine in a medium.

References Cited

UNITED STATES PATENTS 3,222,258  12/1965  Iizuka et al. _____ 195—29

A. LOUIS MONACELL, Primary Examiner

G. M. NATH, Assistant Examiner

U.S. Cl. X.R.

195—28 R, 47 R, 49 R